United States Patent [19]

Duchêne

[11] Patent Number: 5,683,782
[45] Date of Patent: Nov. 4, 1997

[54] PROCESS FOR PRODUCING OF A HONEYCOMB STRUCTURE AND HONEYCOMB STRUCTURE SO PRODUCED

[75] Inventor: Rainer Duchêne, Müllheim, Germany

[73] Assignee: Tubus Bauer GmbH, Bad Sackingen, Germany

[21] Appl. No.: 522,281

[22] PCT Filed: Apr. 29, 1994

[86] PCT No.: PCT/EP94/01371

§ 371 Date: Sep. 13, 1995

§ 102(e) Date: Sep. 13, 1995

[87] PCT Pub. No.: WO94/25258

PCT Pub. Date: Nov. 10, 1994

[30] Foreign Application Priority Data

May 15, 1993 [DE] Germany ............... 43 14 861.1

[51] Int. Cl.$^6$ ........................... B32B 31/02
[52] U.S. Cl. ............... 428/116; 156/244.13; 156/296; 156/308.2; 428/118
[58] Field of Search ................. 156/296, 197, 156/244.13, 308.2, 308.4, 309.6; 264/171.26, 171.12, 172.1; 428/116, 118

[56] References Cited

U.S. PATENT DOCUMENTS

| | | | |
|---|---|---|---|
| 2,645,249 | 7/1953 | Davis | 264/171.26 X |
| 2,908,037 | 10/1959 | Harkenrider | |
| 3,023,461 | 3/1962 | Sherman | 264/171.26 X |
| 3,137,602 | 6/1964 | Lincoln | 482/116 X |
| 3,679,384 | 7/1972 | Colson et al. | 428/116 X |
| 3,825,036 | 7/1974 | Stout | 264/171.26 X |
| 4,618,517 | 10/1986 | Simko, Jr. | |
| 5,030,305 | 7/1991 | Fell | 156/197 |
| 5,032,208 | 7/1991 | Stevens | 156/296 X |
| 5,252,163 | 10/1993 | Fell | 156/197 X |
| 5,316,604 | 5/1994 | Fell | 156/197 X |

FOREIGN PATENT DOCUMENTS

| | | | |
|---|---|---|---|
| 3327694 | 6/1985 | Germany . | |
| 86 24 880.4 | 10/1987 | Germany . | |
| 663 378 | 12/1987 | Switzerland . | |
| 756045 | 8/1956 | United Kingdom . | |
| 1006931 | 10/1965 | United Kingdom . | |
| 1274139 | 5/1972 | United Kingdom | 428/116 |
| 1532112 | 11/1978 | United Kingdom . | |

*Primary Examiner*—Jeff H. Aftergut
*Attorney, Agent, or Firm*—Panitch Schwarze Jacobs & Nadel, P.C.

[57] ABSTRACT

A honeycomb structure (1) comprises a plurality of small tubes (2) bonded to each other along their sides. The small tubes (2) have a base body (4) made of a thermoplastic and which, at least on the outside, preferably on the outside and on the inside, carries a coating (5) made of an adhesively-active thermoplastic material. As a result of this coating (5), a good bonding of the small honeycomb tubes (2) to each other as well as to a cover layer (3) is possible.

8 Claims, 1 Drawing Sheet

PROCESS FOR PRODUCING OF A HONEYCOMB STRUCTURE AND HONEYCOMB STRUCTURE SO PRODUCED

FIELD OF THE INVENTION

The invention pertains to a process for the production of a honeycomb body, which comprises a plurality of small tubes bonded to each other at their sides. The invention also concerns a honeycomb structure which is, in particular, produced according to the above-mentioned process.

BACKGROUND OF THE INVENTION

Honeycomb structures, or honeycombs for short, are used for a large number of different applications. Among other things, they are used for the production of so-called sandwich boards, where on the face of one or both of the lateral honeycomb surfaces, cover layers are applied and bonded to the honeycomb structure. A polyurethane or epoxy resin adhesive can be used for that purpose.

Honeycombs of a reasonable cost are often made of polypropylene which due to its mechanical properties is suitable for very many usage purposes. When polypropylene is used as the construction material for the honeycomb structures, a bonding of the small honeycomb tubes to each other and to a cover layer makes a pretreatment of the contact points of the honeycomb structure necessary. This can be carried out by means of a corona treatment, where for a bonding of the honeycomb with a cover layer, the contact points of the honeycomb body are subjected to an electrical high-voltage treatment. The so-treated contact points can then be easily bonded to a cover layer or the like.

Problematical in this regard is the fact that the corona-treated bonding points remain adhesively-active for only a limited time, so that the bonding with a cover layer must take place either immediately or a short time after the treatment. Often, however, the cover layer or the cover layers are not applied by the honeycomb manufacturer, but by a user to whom they have been supplied, who must then undertake the necessary pretreatment, which, however, only makes sense if large quantities are involved.

For that reason, it is also already known to first provide polypropylene honeycombs with a corona treatment or the like, and then to bond or laminate thereto a layer made of a formed fabric, which itself forms a good bonding base. In this condition, the honeycomb can then be delivered to the end user, who can bond any kind of a cover layer to the formed fabric layer. What is disadvantageous in this regard, however, is that the formed fabric layer will absorb a great deal of adhesive, and as a result, a portion of the weight advantage of a sandwich honeycomb is again lost, and also a great deal of adhesive material must be used.

Because of the above-described problems, the range of applications of a honeycomb made of polypropylene, or of polyolefin in general, is limited, so that in many cases recourse must be made to other, more expensive honeycomb materials.

SUMMARY OF THE INVENTION

As a result, the object exists, in particular, of developing a process that permits a simple and low-cost production of the above-mentioned honeycomb structures, wherein a costly corona or similar intermediate treatment can be dispensed with for the individual small tubes, which may also be made of the various thermoplastic synthetic materials.

It is also an object of the present invention to create a honeycomb of the above-mentioned type, which can be used universally, and in conjunction therewith, can be produced and processed at a reasonable cost. In particular, it should be possible to bond this honeycomb in a problem-free way to cover layers made of different materials while using the previously common adhesives.

For the process of the above-mentioned type, the solution to this object according to the invention resides in the fact that the individual small tubes are manufactured with a layer, at least on the outside, made of a bonding agent or similar kind of adhesively-active thermoplastic material in a co-extrusion process, that the individual small tubes are thereafter lined up alongside each other, and that in a subsequent process step the small tubes lying adjacent to one another are subjected to a thermal treatment for bonding or joining them.

With the aid of the process according to the invention, the individual small tubes are produced together with an adhesively-active layer quickly and in a simple way in a co-extrusion process. Preferably, the adhesively-active layer comprises a thermoplastic bonding agent which, in comparison to the material of the small tubes, becomes plastic and develops its good adhesive properties at a lower temperature. Following the production of the small tubes, they are lined up longitudinally alongside each other to form a honeycomb body. By means of a subsequent thermal treatment, the bonding agent layer provided at least on the outsides of the small tubes is activated, so that even after the small tubes have cooled off, they are held to each other in the desired form.

With the process in accordance with the invention, the previously common corona treatment of the individual small tubes can be dispensed with, and specifically, this is independent of the material from which the individual small tubes are made. By way of example, the small tubes can comprise polycarbonate or, preferably, can also be made from a flexible thermoplastic synthetic material.

In order also to be able to bond a cover layer securely to the honeycomb structure subsequent to this, it is beneficial if the individual small tubes are produced with an outside and inside layer made of a bonding agent or the like.

An especially simple and therefore preferred processing method provides for subjecting the small tubes to a hot-air treatment for the bonding or joining of the small tubes lying alongside of each other. By means of such a hot-air treatment, the bonding agent layer on the outside and possibly on the inside of the individual small tubes can also be activated in a simple way, and transformed to its plastic state.

With the honeycomb structures of the above-mentioned type, the solution in accordance with the invention provides, in particular, that the small honeycomb tubes have a base body made from a polyolefin and carrying, at least on the outside, a coating made of an adhesively-active thermoplastic material. The adhesively-active coating makes possible, on the one hand, a strong bonding of the small tubes to each other, and in addition, cover layers can also be securely bonded to the small honeycomb tubes on their ends. The application of the adhesively-active coating can take place during the extrusion production of the small tubes in the co-extrusion process in accordance with the invention.

As the adhesively-active coating, a thermoplastic bonding agent is preferred which, in comparison with the small tube material, becomes plastic and develops its good bonding properties at lower temperatures. However, for example, polycarbonate, a polyamide, a polyetherimide or the like can also be considered for the adhesively-active coating. Polycarbonate can be bonded especially well, polyamide forms a surface that is especially chemically stable, and a polyetherimide can be used in order to achieve a higher temperature stability.

Preferably, it is provided that the adhesively-active coating is provided on the inside and on the outside of the small honeycomb tubes. In this regard, the outside coating is effective in particular for the bonded or adhesive joint between the adjacent small tubes, while the inside coating produces an especially stable bonding with a cover layer.

Specifically, in the case of the cover layer bonding, the adhesive can engage somewhat with the small tubes on the inside, so that an enlarged bonding joint surface is formed. This would not be possible in the case of small tubes that are, for example, hexagonal in cross-section, because the outside walls lie next to each other, and with small round tubes, it would be possible only to a very limited extent on the outside. As a result of the coating of the insides with adhesively-active material, small tubes that are round or even polygonal in cross-section, in particular hexagonal, can also be used just as well for the honeycomb.

BRIEF DESCRIPTION OF THE DRAWINGS

In the following, the invention and its essential features are explained in more detail with the aid of the drawings.

In the drawings.

DETAILED DESCRIPTION OF PREFERRED EMBODIMENTS

Figure 1:
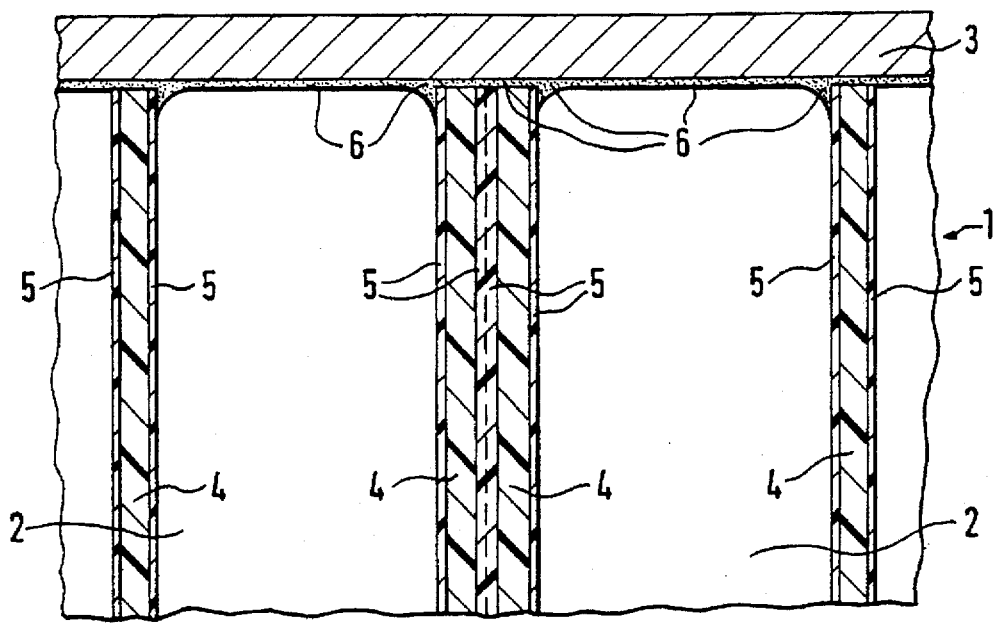
FIG. 1 is a greatly enlarged sectional representation of a honeycomb segment with a cover layer.

Shown in FIG. 1 is a partial segment of a honeycomb 1 with two adjacent small tubes 2 which are bonded to a cover layer 3. For the sake of clarity, this segment is represented in greatly enlarged scale. Usually, the small honeycomb tubes 2 have a diameter of several millimeters, for example 3 to 5 mm.

The individual small tubes 2 comprise a base body 4 made of thermoplastic, for example a polyolefin, and a coating 5 made of an adhesively-active thermoplastic material. In the embodiment shown, the coating 5 is provided both on the inside as well as on the outside of the individual small tubes 2. Under some circumstances, an outside coating would be sufficient.

The small tubes 2 are held to each other with the aid of the outside bonding agent layer or the like, which was activated by means of a transient thermal treatment. The cover layer 3 is bonded with the open ends of the small tubes 2 with the aid of an adhesive, which can adhere well to the inside bonding-agent layer. For the sake of clarity, the adhesive layers are shown as dots.

Figure 2:
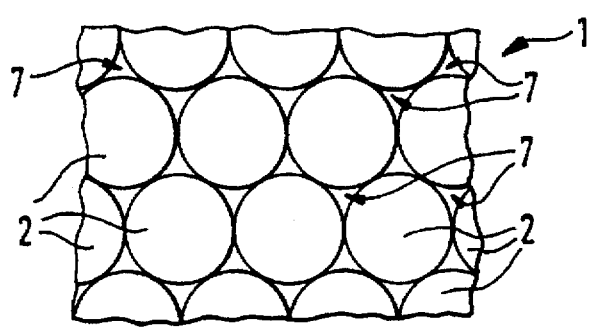
FIG. 2 is a greatly enlarged view of a honeycomb segment with small tubes that are round in cross-section.

If only the outsides were provided with the coating 5, only very small bonding surfaces would result in the area of the joint with the cover layer 3. In the case of small tubes 2 that are round in cross-section (FIG. 2), the adhesive holding the cover layer 3 can indeed engage somewhat with the intermediate spaces 7 formed by three adjacent small tubes 2, so that in the case of round small tubes, a somewhat enlarged bonding surface is available at least in this region.

Figure 3:
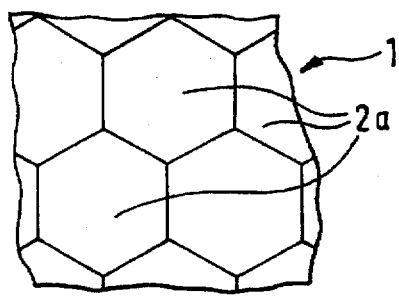
FIG. 3 is a greatly enlarged view of a honeycomb with small tubes that are hexagonal in cross-section.

In the case of small tubes 2a that are hexagonal in cross-section (FIG. 3), such intermediate spaces 7 are not available, so that in this case, an adhering of the adhesive 6 can take place only at the ends of the very thin coating 5, which, however, does not provide an especially strong joint. Preferably, it is therefore provided that the small tubes 2, 2a also have an adhesively-active coating 5 on the inside, as is shown in FIG. 1. As a result, the adhesive 6 can bond in the border area between the cover layer 3 and the ends of the small honeycomb tubes 2, 2a with a somewhat larger surface area, so that a very stable bonding is present between the cover layer 3 and the honeycomb structure.

The adhesively-active coating 5, which enters into an especially good joint with the adhesive 6, is applied to the walls of the small honeycomb tubes 2, 2a in a thermoplastic co-extrusion process or, more specifically, during the production of the small honeycomb tubes it is also thermoplastically bonded directly with them. The coating 5 can be a polycarbonate, a polyamide, a polyetherimide, or the like. As the adhesively-active layer, a thermoplastic bonding agent is preferred, however.

Such a layer made of a thermoplastic bonding agent also makes it possible to dispense with the use of a dispersion adhesive during the production of the honeycomb structure. Thus, since with the process in accordance with the invention, no dispersion adhesive has to be used for the production of the honeycomb structures, the process in accordance with the invention is more ecologically favorable, more reasonable in cost, and, because of the exclusive use of thermoplastic materials, allows the produced honeycombs to be recycled in a simple way if so desired.

I claim:

1. A honeycomb structure comprising a plurality of small tubes bonded to each other at their sides, the small tubes (2, 2a) comprising a base body (4) made of a thermoplastic material, the base body having a coating (5) made of an adhesively-active thermoplastic material on an inside and an outside thereof, a cover layer (3) bonded to ends of the small tubes on at least one side of the structure with an adhesive (6) which bonds with said adhesively-active thermoplastic material on at least the insides of the tubes.

2. The honeycomb structure according to claim 1, wherein the adhesively-active thermoplastic material is selected from the group consisting of polycarbonate, polyamide and polyetherimide.

3. The honeycomb structure according to claim 1 wherein the small tubes have a cross-section selected from the group consisting of round and polygonal.

4. The honeycomb structure according to claim 1, wherein a base body of the small tubes comprises a thermoplastic material.

5. The honeycomb structure according to claim 4, wherein the thermoplastic material of the base body is selected from the group consisting of polyolefin and polycarbonate.

6. The honeycomb structure according to claim 1, wherein the small tubes have a diameter of 3 to 5 mm.

7. A process for producing honeycomb structure having a plurality of small tubes bonded to each other at their sides, comprising producing a plurality of individual small tubes (2, 2a) with a layer of adhesively-active thermoplastic material on an outside and an inside of the tubes in a co-extrusion process, aligning the individual small tubes (2, 2a) alongside each other, bonding the small tubes lying adjacent to one another together by subjecting them to a thermal treatment, bonding at least one cover layer (3) to the ends of the tubes using an adhesive (6) which bonds with said adhesively-active thermoplastic material on at least the inside of the tubes.

8. The process according to claim 7, wherein the thermal treatment comprises a hot-air treatment.

* * * * *